C. D. KARR.
POULTRY FEEDER.
APPLICATION FILED APR. 15, 1916.

1,209,973.

Patented Dec. 26, 1916.

Inventor
Charles D. Karr

By Ithiel J. Cilley
Attorney

UNITED STATES PATENT OFFICE.

CHARLES DUTTON KARR, OF HOLLAND, MICHIGAN.

POULTRY-FEEDER.

1,209,973.  Specification of Letters Patent.  Patented Dec. 26, 1916.

Application filed April 15, 1916. Serial No. 91,336.

*To all whom it may concern:*

Be it known that I, CHARLES DUTTON KARR, a citizen of the United States, residing at Holland, in the county of Ottawa and State of Michigan, have invented certain new and useful Improvements in Poultry-Feeders, of which the following is a specification.

My invention relates to improvements in appliances for feeding poultry, and its objects are: first, to provide a poultry feeder with which the feeding element may be readily adjusted to allow of feeding various sizes of grain, as wheat and corn; second, to provide a means to induce considerable exertion and interest on the part of the poultry in its efforts to procure the food; third, to avert the danger of the food becoming clogged in the hopper or feed receptacle and holder. I attain these objects by the mechanism illustrated in the accompanying drawing, in which—

Figure 1:
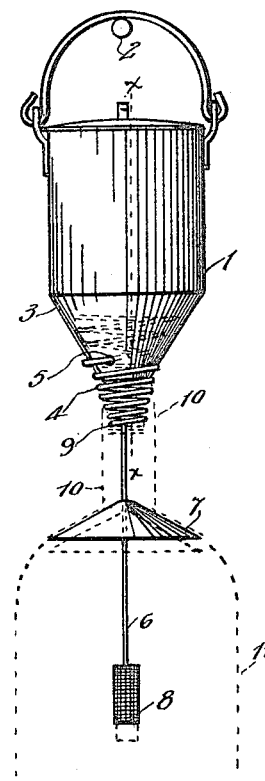
Figure 2:
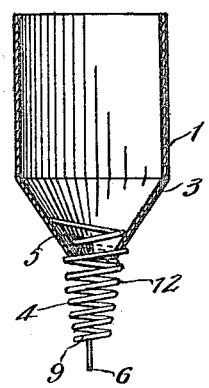

Figure 1 is an elevation of the feeder complete, showing in dotted lines, the manner of distributing the grain as it falls out of the feeder; Fig. 2 is a sectional elevation of the receiving or storing cylinder or food receptacle with the valve lowered to show its position when desiring to feed coarse food, as corn, &c. (See dotted lines 2, 2 on Fig. 1.)

Similar numerals refer to similar parts throughout the two views shown.

In the construction of this feeder I make use of an ordinary storage chamber or food hopper, 1, which is supported in the usual manner, as being hung upon a peg, as 2, some distance above the ground or the poultry house floor.

My feeding element consists of an adjustable, coiled wire spring valve 4 which is suspended below the conical bottom 3 of the food hopper, by passing the free end of the wire from which the valve is made, through a suitable hole, as 5, in the side of the said conical bottom of the food hopper. The valve should be made of finely tempered spring wire that will be drawn downward easily and will readily return into its normal form and position so that a slight effort on the part of poultry will cause a free distribution of feed in small amounts and at such intervals as to avert all danger of overfeeding.

I place a bottom 9 in the lower end of the spring valve 4, and to this bottom I secure a cable, cord, wire or other suitable support, as 6, upon which I mount, some distance below the valve, a conical distributer 7, in such a manner and position that when feed is discharged from the valve 4, as at 10, it will strike upon the upper surface of this distributer and in rolling off to the ground it will be made to diverge to a considerable extent outside of the rim thereof, as indicated at 11, for the purpose of scattering it over as large an area as possible.

Below the distributer 7 I place a bait receptacle or holder 8, which is supported on the lower end of the cord or cable 6 in convenient reach of the poultry to be fed. It will be readily understood that with the valve 4 made of the proper kind of wire, by slight disturbance of the bait 8, as by a fowl picking at it, the valve 4 will be made to vibrate sufficiently to allow any feed that it may contain, to fall out between the coils of wire in small quantities.

If I desire to feed small grain, as wheat, oats, &c., I screw the valve 4 well up into the cone 3 of the food receptacle 1 so the grain can escape only between the more closely wound coils at the lower end of the valve. If, however, I desire to feed coarse grain, as corn, &c., I lower the valve by turning it to the left until the openings between the coils, near the upper end of the valve, will allow the coarser grain to pass through when the bait is agitated.

The advantage of my spring valve for discharging the grain, over the ordinary devices for the purpose is that it may be instantly adjusted, in the simplest possible manner, for feeding different sizes of grain, and there is no possible chance for the grain to become clogged in the valve. The cone 3 has an opening 12 for the free passage of food to the valve 4 without danger of its becoming clogged in the receptacle 1.

What I claim as new, and desire to secure by Letters Patent of the United States, is:

1. In a poultry feeder, a feed receptacle having an opening at the lower end and having a hole through the side, a coiled wire spring valve adjustably screwed through said hole and a distributer and bait suspended from the bottom of the coiled wire valve.

2. In a poultry feeder, a receptacle having an opening at the lower end and having a hole through the side, a valve made of spring wire with the coils close together at the lower end and gaged farther apart as they approach the upper end of the valve, the free end of the valve wire passed through the hole in the side of the receptacle and the valve made vertically adjustable by screwing the wire into, or out of the receptacle, and a distributer and bait suspended below the valve.

3. In a poultry feeder, a food receptacle and a bait-holder, in combination with a conically formed coiled wire spring valve having its larger end adjustably connected with the receptacle, and its smaller end connected with the bait so that any agitation of the bait will operate the valve to discharge food, the size of the food discharged being regulated by the relative position of the valve with the receptacle.

Signed at Holland, Michigan, April 10, 1916.

CHARLES DUTTON KARR.

Copies of this patent may be obtained for five cents each, by addressing the "Commissioner of Patents, Washington, D. C."